United States Patent
Schmiedlin et al.

(10) Patent No.: US 8,296,484 B2
(45) Date of Patent: Oct. 23, 2012

(54) ALPHANUMERIC DATA ENTRY APPARATUS AND METHOD USING MULTICHARACTER KEYS OF A KEYPAD

(75) Inventors: Joshua L. Schmiedlin, Rochester Park, NY (US); William M. D. Cahoon, Wolcott, NY (US)

(73) Assignee: Harris Corporation, Melbourne, FL (US)

( * ) Notice: Subject to any disclaimer, the term of this patent is extended or adjusted under 35 U.S.C. 154(b) by 1419 days.

(21) Appl. No.: 11/394,021

(22) Filed: Mar. 30, 2006

(65) Prior Publication Data

US 2007/0237310 A1    Oct. 11, 2007

(51) Int. Cl.
G06F 17/00    (2006.01)
G06F 13/12    (2006.01)

(52) U.S. Cl. .................. 710/67; 706/47; 706/21
(58) Field of Classification Search ............ 710/67; 345/168; 379/93.18; 706/20, 21, 47
See application file for complete search history.

(56) References Cited

U.S. PATENT DOCUMENTS

| | | | |
|---|---|---|---|
| 4,307,266 A | 12/1981 | Messina | |
| 4,532,378 A | 7/1985 | Nakayama et al. | |
| 4,608,457 A | 8/1986 | Fowler | |
| 5,031,206 A | 7/1991 | Riskin | |
| 5,818,437 A | 10/1998 | Grover | |
| 5,828,991 A | 10/1998 | Skiena | |
| 5,903,630 A | 5/1999 | Collins | |
| 5,911,485 A | 6/1999 | Rossmann | |
| 5,945,928 A | 8/1999 | Kushler et al. | |
| 5,952,942 A | 9/1999 | Balakrishnan | |
| 5,953,541 A | 9/1999 | King | |
| 5,960,385 A | 9/1999 | Skiena | |
| 5,974,121 A | 10/1999 | Perera | |
| 6,011,554 A | 1/2000 | King | |
| 6,052,443 A | 4/2000 | Perera | |
| 6,054,941 A | 4/2000 | Chen | |
| 6,137,867 A | 10/2000 | Perera | |
| 6,150,962 A | 11/2000 | Rossmann | |
| 6,219,731 B1 | 4/2001 | Gutowitz | |
| 6,286,064 B1 | 9/2001 | King | |
| 6,307,548 B1 | 10/2001 | Flinchem | |
| 6,307,549 B1 | 10/2001 | King | |
| 6,346,894 B1 | 2/2002 | Connolly | |
| 6,799,303 B2 | 9/2004 | Blumberg | |
| 6,801,190 B1 * | 10/2004 | Robinson et al. ............. | 345/173 |
| 6,885,317 B1 | 4/2005 | Gutowitz | |
| 7,075,519 B2 * | 7/2006 | Hsi ................................ | 345/168 |
| 7,218,249 B2 * | 5/2007 | Chadha ......................... | 341/23 |
| 7,453,439 B1 * | 11/2008 | Kushler et al. ................ | 345/168 |
| 7,610,194 B2 * | 10/2009 | Bradford et al. ............... | 704/10 |

(Continued)

OTHER PUBLICATIONS

Intl Sch Rpt PCT/US07/07731, Harris Corporation, Mar. 28, 2007.

(Continued)

*Primary Examiner* — Ernest Unelus
(74) *Attorney, Agent, or Firm* — Allen, Dyer, Doppelt, Milbrath & Gilchrist, P.A.

(57) ABSTRACT

A method and apparatus for predicting the desired alphanumeric character of a depressed multi-character key of a reduced-key keypad based upon the previous selection of characters. Rule trees defining the prediction associated with a depressed key based upon the previous selection of characters are dynamically built upon use to readily function with all language styles and vocabularies. Moreover, the rule trees are weighted to increase the probability of predicting the desired character and to be quickly adaptable to different users having different language styles or vocabularies.

22 Claims, 12 Drawing Sheets

U.S. PATENT DOCUMENTS

| | | | |
|---|---|---|---|
| 7,656,317 B2 * | 2/2010 | Salman et al. | 341/23 |
| 7,679,534 B2 * | 3/2010 | Kay et al. | 341/22 |
| 7,860,536 B2 * | 12/2010 | Jobs et al. | 455/566 |
| 2002/0136372 A1 * | 9/2002 | Bozorgui-Nesbat | 379/93.18 |
| 2004/0021691 A1 | 2/2004 | Dostie et al. | 345/773 |
| 2004/0164951 A1 | 8/2004 | Lun Pun et al. | 345/156 |
| 2005/0193022 A1 * | 9/2005 | Rigerts et al. | 707/200 |
| 2005/0200609 A1 * | 9/2005 | Van der Hoeven | 345/169 |
| 2006/0044277 A1 | 3/2006 | Fux et al. | 345/168 |
| 2010/0153096 A1 * | 6/2010 | Fux et al. | 704/9 |
| 2010/0257478 A1 * | 10/2010 | Longe et al. | 715/773 |

OTHER PUBLICATIONS

Wigdor, Daniel, "TiltText: Using Tilt for Text Input to Mobile Phones", In proceedings of the 16th Annual ACM symposium on User Interface software and technology, Vancouver, Canada, pp. 81-90, 2003.

* cited by examiner

ALPHANUMERIC DATA ENTRY APPARATUS AND METHOD USING MULTICHARACTER KEYS OF A KEYPAD

BACKGROUND OF THE INVENTION

1. Field of the Invention

This invention relates to the keypad entry of data. More particularly, this invention relates to the entry of alphanumeric data using a keypad having more than one alphanumeric character assigned to a key.

2. Description of the Background Art

Historically, a conventional "rotary" telephone included a rotary dial with 10 finger-holes, numbered 1-9 and 0, that allowed a person to sequentially dial each numeric digit of the desired telephone number to be called. With the age of the transistor, electronic telephones with dual tone, multiple frequency (DTMF) keypads that included 10 numeric keys labeled 1-9 and 0 came into widespread use and completely supplanted the conventional rotary telephone.

The conventional DTMF keypad commonly included two additional unnumbered keys labeled * and #. Combined with the numbered keys, the topography of a conventional DTMF keypad therefore comprised a 3×4 layout with the 0 key positioned in the $4^{th}$ row between the * and # keys, for a total of 12 keys. With considerable foresight, the manufacturers of DTMF keypads also assigned and labeled the 26 letters of English alphabet to the numbered keys (excepting key 1) to allow the DTMF keypad to enter of alphanumeric data. Commonly, if not universally, key 2 was labeled with the letters A, B & C, key 3 with D, E & F, key 4 with G, H & I, key 5 with J, K & L, key 6 with M, N & O, key 7 with P, Q, R & S, key 8 with T, U & V, key 9 with W, X, Y & Z.

Various "multitap" techniques were devised, with appropriate decoding circuitry, to allow the selection of the desired alpha character by multi-tapping the key containing the key to which the alpha character is assigned. The most prevalent multitap technique included pressing the key labeled with the desired alpha character the number of times equal to the position of the alpha character on the key, and then either waiting for a default time-out period or pressing a different key. For example, when the letter B is desired, key 2 is pressed twice, represented by the fact that the letter B is located in the second position on key 2. Correspondingly, when the letter C is desired, key 2 is pressed three times, represented by the fact that the letter C is located in the third position on key 2. Representative early patents that teach multi-tapping techniques and appropriate decoding circuitry include U.S. Pat. No. 4,307,266, U.S. Pat. No. 4,532,378 and U.S. Pat. No. 4,608,457, the disclosures of which are hereby incorporated by reference herein.

Early implementations of alphanumeric DTMF keypads allowed the deaf to communicate using a conventional telephone. In the 1980's, telephones with alphanumeric DTMF keypads became essential to interactive voice response telephony systems that required alphanumeric data to be entered. In the 1990's, alphanumeric DTMF keypads came in widespread use to enter alphanumeric data for telephony small messaging services (SMS). More recently, conventional alphanumeric DTMF keypads, and other reduced-key alphanumeric keypads with multiple alphanumeric characters assigned to one or more keys, have been ubiquitously employed in a host of other applications to enter alphanumeric data, such as but not limited to personal digital assistants and instrumentation.

Unfortunately, as discussed above, conventional multitap techniques necessitate the pressing of a key a multiple of times to "scroll" through the multiple characters associated therewith to select a single alphanumeric character. For example, in a conventional DTMF keypad referenced above, the respective keys 2-9 must be depressed twice to select the letters B, E, H, K, N, Q, U and X and three times to select the letters C, F, I, L, O, R, V and Y, whereas respective keys 7 & 9 must be depressed four times to select the letters S and Z. Indeed, whenever multiple alphanumeric characters are assigned to a particular key in reduced-key alphanumeric keypads, excessive depressing of the respective keys is required to scroll through the associated alphanumeric characters.

Presently there exist various techniques for minimizing the number of depressions of the multi-character keys of a reduced-key alphanumeric keypad to scroll through and select a particular alphanumeric character associated therewith. One common approach is to employ a dictionary database and to then predict the desired alphanumeric character based upon the entry of alphanumeric characters that match the most commonly used words in the dictionary.

For example, Tegic Communications (http://www.t9.com) provides a dictionary-based software application, identified by the trademark "T9", that reads a string of keystrokes and then sequentially presents the most commonly used words from a language-specific dictionary corresponding to the alphanumeric characters associated with such keys. To illustrate, the English dictionary database could include the word "how" and could prioritize it as the most-commonly used word associated with the DTMF keystroke sequence 4-6-9. Then, upon the entry of the keystroke sequence 4-6-9, the word "how" is displayed and offered for selection by the user. If "how" was the intended word, it would have been selected with only three keystrokes (in contrast to the multitap technique discussed above that would have required six keystrokes). If "how" was not the intended word, the user may then depress a key designated as the "next" key to instruct the program to display the next most commonly used word. If repeated depressing of the "next" key does not display the desired word, the desired word may be manually entered into the dictionary using the multitap method.

T9 has achieved substantial commercial success but requires considerable memory for storing the language-specific dictionary. Moreover, since the dictionary is language-specific, T9 is not particularly suited for multi-language use or other less common implementations that often employ acronyms, abbreviations, scientific words or the like.

Representative patents assigned to Tegic Communications, Inc. relating to its T9 software, the disclosures of which are hereby incorporated by reference herein, include:

| PAT. NO. | Title |
| --- | --- |
| 6,307,549 | Reduced keyboard disambiguating system |
| 6,307,548 | Reduced keyboard disambiguating system |
| 6,286,064 | Reduced keyboard and method for simultaneous ambiguous and unambiguous text input |
| 6,011,554 | Reduced keyboard disambiguating system |
| 5,953,541 | Disambiguating system for disambiguating ambiguous input sequences by displaying objects associated with the generated input sequences in the order of decreasing frequency of use |
| 5,945,928 | Reduced keyboard disambiguating system for the Korean language |
| 5,818,437 | Reduced keyboard disambiguating computer |

Another common approach for minimizing the number of depressions of the keys of a reduced-key alphanumeric keypad to scroll through to select a particular alphanumeric character associated therewith, is to employ a linguistic-based algorithm that predicts the desired alphanumeric character based pre-defined linguistic rules. For example, Eatoni Ergonomics, Inc. provides a software program sold under the trademark "Letterwise" that includes a number of linguistic rules that predict the desired letter of a depressed multi-character key based upon the previous entry of other characters. A simple example of a linguistic rule is to offer the letter "u" upon depressing the multi-character (T, U & V) key 8 whenever the previously-entered letter is the letter "q", since neither the letters "t" or "v" would linguistically be appropriate. The linguistic theory employed is disclosed in Eatoni's patents including U.S. Pat. No. 6,885,317, entitled "Touch-typable devices based on ambiguous codes and methods to design such devices" and U.S. Pat. No. 6,219,731 entitled "Method and Apparatus for Improved Multi-Tap Text Input", the disclosures of which are hereby incorporated by reference herein.

Like dictionary-based T9, linguistic-based Letterwise is language-specific. Letterwise may be preferred in scientific applications that employ less-common words since even scientific words are often linguistic-based and fewer keystrokes would probably be necessary. However, both T9 or Letterwise are unable to predict uncommon acronyms or abbreviations, such as in a military application.

Still other representative patents that disclose algorithms for predicting a desired character (or words) based upon the entry of previous characters (or words) may be found in the following US patents, the disclosures of which are hereby incorporated by reference herein.

| U.S. Pat. No. | Title |
|---|---|
| 5,952,942 | Method and Device for Input of Text Messages from a Keypad |
| 5,974,121 | Alphanumeric Message Composing Method using Telephone Keypad |
| 6,052,443 | Alphanumeric Message Composing Method using Telephone Keypad |
| 6,054,941 | Apparatus and Method for Inputting Ideographic Characters |
| 6,137,867 | Alphanumeric Message Composing Method using Telephone Keypad |
| 5,828,991 | Sentence Reconstruction using Word Ambiguity Resolution |
| 5,960,385 | Sentence Reconstruction using Word Ambiguity Resolution |
| 5,031,206 | Method and Apparatus for Identifying Words Entered on DTMF Pushbuttons |
| 5,903,630 | Method and Apparatus for Specifying Alphanumeric Information with a Telephone Keypad |
| 6,150,962 | Predictive Data Entry Method for a Keyboard |
| 6,346,894 | Method and System for Intelligent Text Entry on a Numeric Keypad |
| 6,643,371 | Method and Apparatus for Alphanumeric Data Entry |
| 5,911,485 | Predictive Data Entry Method for a Keypad |
| 6,799,303 | Speed Typing Apparatus and Method |

Therefore, it is an object of this invention to provide an improvement which overcomes the aforementioned inadequacies of the prior art methods and provides an improvement which is a significant contribution to the advancement of the art.

Another object of this invention is to provide an apparatus and method for the entry of alphanumeric data using a keypad having one or more alphanumeric characters assigned to each key, wherein a rule tree defining the prediction associated with a depressed key is built based upon the previous selection of characters and is also weighted based upon the number of times the rule tree previously correctly defined the prediction to thereby increase the probability of predicting the desired character and to be quickly adaptable to different users having different language styles or vocabularies The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing the invention, the invention comprises a method and apparatus for predicting the desired alphanumeric character of a multi-character key of a reduced-key keypad that is depressed. Words composed of characters (hereinafter Character1, Character2, Character3, etc.) can thus be entered using DTMF and other keypads having multi-character keys.

More particularly, when a particular key is depressed to select a Character1, the First Character Rule List that corresponds to one of the characters associated with that key is recalled from memory, and the character is displayed. The user may select such character by waiting a default period or by selecting a different key, whereupon its corresponding Rule Tree, comprising of a multi-level hierarchical tree of previously-entered alphanumeric sequences associated with that character of that key, is also recalled from memory. If the displayed character is not the desired character another character associated with that key is then displayed after the user makes a request by pressing the same key (i.e., a multitap). The user may select such character by waiting a default period or by selecting a different key, whereupon its corresponding Rule Tree, likewise comprising of a multi-level hierarchical tree of previously-entered alphanumeric sequences associated with that character of that key, is also recalled from memory. If the displayed character is not the desired character, other characters associated with that key are sequentially displayed at the user's request until the desired character is selected (up to a maximum of three times in the case of a key having three characters associated therewith, four times in the case of a four-character key, etc.). Character1 is thus selected.

Then, upon the entry of the next key to select the desired Character2, the Rule Tree is again parsed to predict Character2 based upon the previously-entered Character1. Similarly, upon the entry of the next key to select the desired Character3, the Rule Tree is still again parsed to predict Character3 based upon the previously-entered Character1 and Character2. This process is repeated until all of the characters of the desired word are predicted based upon the preceding configured number of previous characters (i.e., at least one, preferably two and more preferably three) and displayed for selection. Whenever a character is selected that had not been previously displayed, the Rule Tree is modified to include it as a possible selection. Hence, the Rule Tree is dynamically built as more characters are selected. Moreover, an increment counter corresponding to the number of times a displayed character is selected based upon the previously-selected character(s), is used to weight it to thereby display it over other characters of a lesser count that also follow the same previously-selected character(s).

Once the word is selected and a space is entered, the method repeats itself by recalling from memory the Rule Tree associated with First Character Rule List that corresponds to the next key that is depressed.

Importantly, the Rule Tree may be based upon the previously-entered alphanumeric character sequence(s) that are upon each use stored in memory to dynamically "build" the Rule Tree. Thus, the Rule Tree is formed upon actual use and are not dictated by linguistic rules or suggested by stored dictionaries. Moreover, since the counter serves to weight the characters following previously-selected character(s) (i.e., one, preferably two and more preferably three previously-selected characters), the likelihood of predicting the desired character is equally applicable to acronyms, abbreviations, scientific words, and the like and serves the additional purpose of being quickly adaptable to different users using different vocabularies, languages or having different writing styles.

The apparatus and method of the invention may be employed with any keypad of any topology having one or more keys with one or more characters associated therewith and, specifically, is not limited to use with DTMF keypads. Further, the apparatus and method of the invention may be employed with any language, including languages that may include one or more symbols, such as the Japanese language, associated with a particular key of the keypad.

For purpose of illustration, a simplified example of the predicting characters according to the invention is as follows:

Upon the previous entry of the word "Mississippi", the following Rule Tree (each upper portion of the boxes representing the character and the lower portion of the boxes indicating the increment count of the character that followed the two previously-entered characters) and First Character Rule List would be built:

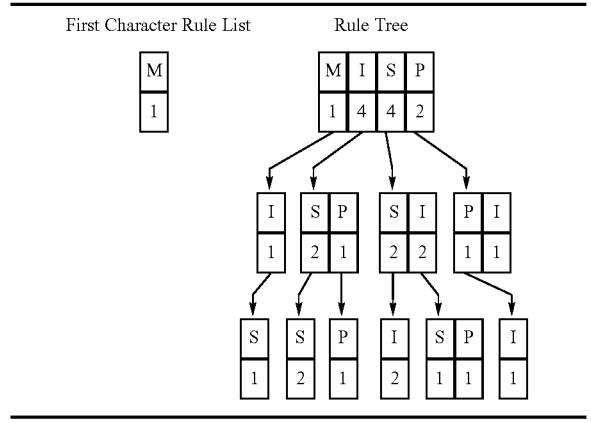

Since the system has already seen the word Mississippi and created the Rule Tree for it as shown above, the prediction will proceed as follows the next time a user attempts to enter Mississippi:

Given the key mapping:
Key 1=A, B, C
Key 2=D, E, F
Key 3=G, H, I
Key 4=J, K, L
Key 5=M, N, O
Key 6=P, Q, R
Key 7=S, T, U
Key 8=V, W, X
Key 9=Y, Z the key sequence of 5, 3, 7, 7, 3, 7, 7, 3, 6, 6 & 3 would predict the following based upon the respective two previously-entered characters:

| Key Pressed | Previous Characters | Prediction Rule Used | Prediction Given | Correct/ Incorrect |
| --- | --- | --- | --- | --- |
| 5 = M, N, O | <space> | *M:1 | 'M' | Correct |
| 3 = G, H, I | "M" | M -> I | 'I' | Correct |
| 7 = S, T, U | "MI" | MI -> S | 'S' | Correct |
| 7 = S, T, U | "mIS" | IS -> S | 'S' | Correct |
| 3 = G, H, I | "miSS" | SS -> I | 'I' | Correct |
| 7 = S, T, U | "misSI" | SI -> S | 'S' | Correct |
| 7 = S, T, U | "missIS" | IS -> S | 'S' | Correct |
| 3 = G, H, I | "missiSS" | SS -> I | 'I' | Correct |
| 6 = P, Q, R | "mississI" | SI -> P | 'P' | Correct |
| 6 = P, Q, R | "mississIP" | IP -> P | 'P' | Correct |
| 3 = G, H, I | "mississiPP" | PP -> I | 'I' | Correct |

In contrast, without the benefit of the invention's predication rules, if a user sought to enter "Mississippi" using conventional multi-taps, the following would occur.

| Key Pressed | Previous Characters | Prediction Rule Used | Prediction Given | Correct/ Incorrect |
| --- | --- | --- | --- | --- |
| 5 = M, N, O | <space> | None | 'M' | Correct |
| 3 = G, H, I | "M" | None | 'G' | Incorrect |
| 7 = S, T, U | "MI" | None | 'S' | Correct |
| 7 = S, T, U | "mIS" | None | 'S' | Correct |
| 3 = G, H, I | "miSS" | None | 'G' | Incorrect |
| 7 = S, T, U | "misSI" | None | 'S' | Correct |
| 7 = S, T, U | "missIS" | None | 'S' | Correct |
| 3 = G, H, I | "missiSS" | None | 'G' | Incorrect |
| 6 = P, Q, R | "mississI" | None | 'P' | Correct |
| 6 = P, Q, R | "mississIP" | None | 'P' | Correct |
| 3 = G, H, I | "mississiPP" | None | 'G' | Incorrect |

As can be readily seen, using conventional multi-tap techniques, the letter-selection accuracy was 7 out of 11 correct or 63.6%. In contrast, due to the prior entry of the word "Mississippi" to build the Rule Tree according to the invention, the accuracy was 100%.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other circuits and assemblies for carrying out the same purposes of the present invention. It should also be realized by those skilled in the art that such equivalent circuits and assemblies do not depart from the spirit and scope of the invention as set forth in the appended claims.

BRIEF DESCRIPTION OF THE DRAWINGS

For a fuller understanding of the nature and objects of the invention, reference should be had to the following detailed description of the preferred embodiment taken in connection with the accompanying drawings in which.

Similar reference characters refer to similar parts throughout the several views of the drawings.

DETAILED DESCRIPTION OF THE PREFERRED EMBODIMENT

Figure 1:
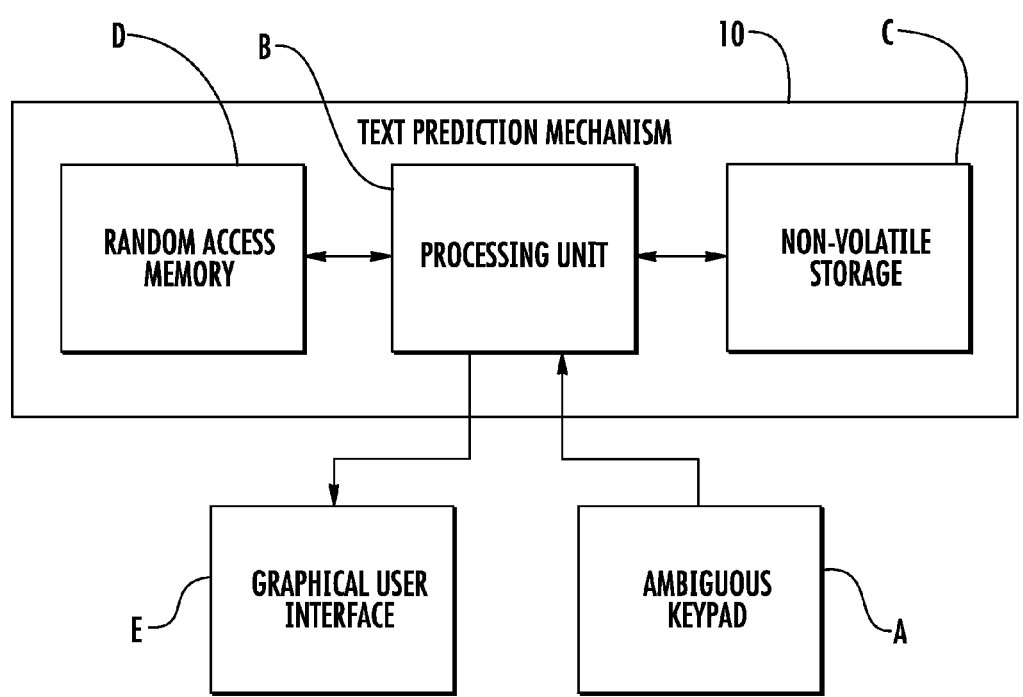
FIG. 1 is a block diagram of the apparatus of the invention in which each depressing of the keys of an ambiguous keypad (a keypad having more than one character assigned to one or more keys) are processed by a processing unit operatively coupled to non-volatile memory and random-access memory.

FIG. 1 is a block diagram of the text prediction mechanism 10 of the invention in which each depressing of the keys of an ambiguous keypad A (a keypad having more than one character assigned to one or more keys) are processed by a processing unit B operatively coupled to non-volatile memory C and random-access memory D. The predictions are then displayed by means of a graphical user interface E.

Figure 2:
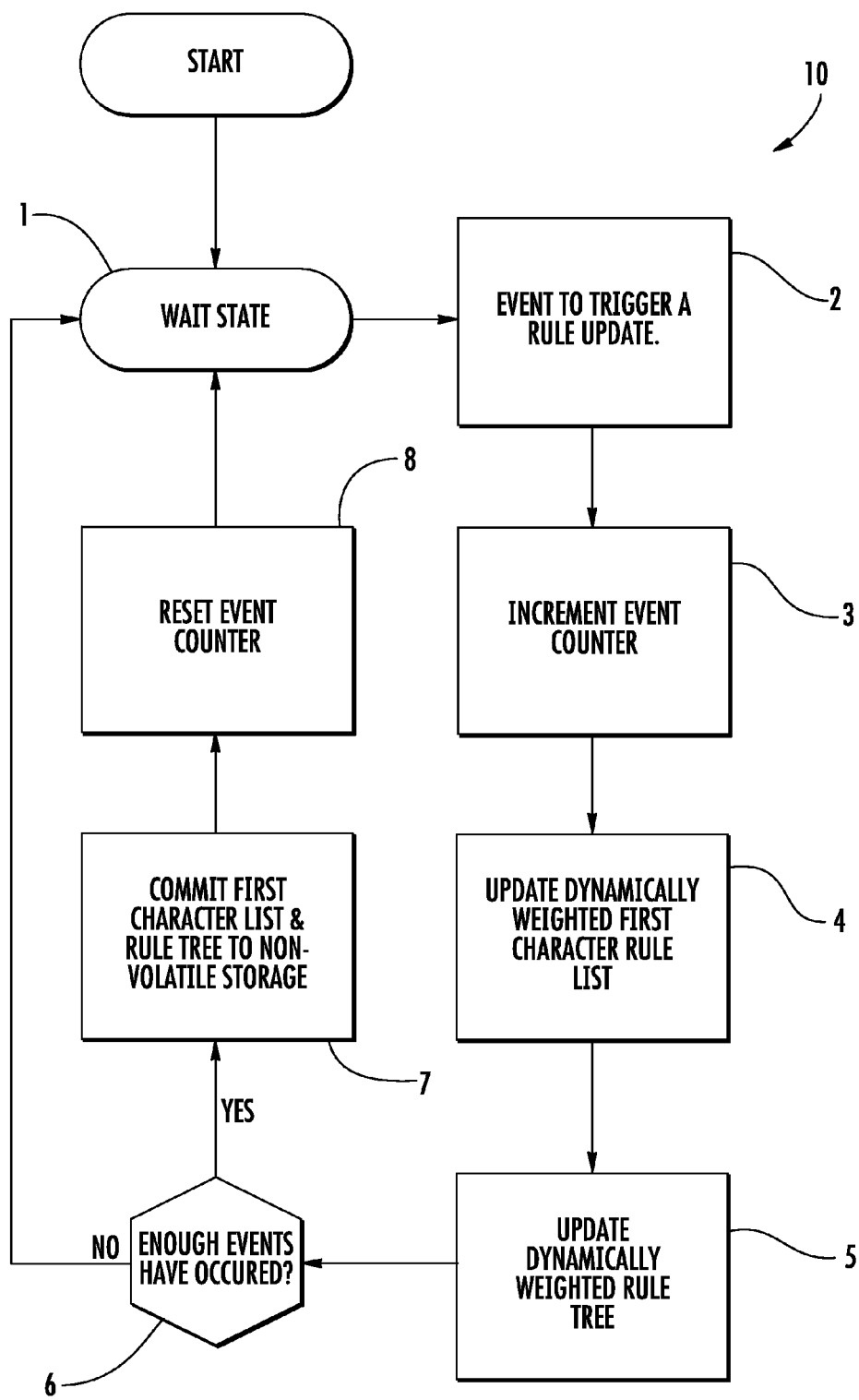
FIG. 2 is a flow chart showing the High Level System Flow of the computer program implementing the method of the invention.

FIG. 2 is a flow chart showing the High Level System Flow of the computer program implementing the method of the invention. The program starts with a Wait State 1, waiting for a Triggering Event 2, which preferably comprises the end of every word or message, but may alternatively be every key press, or whatever is the most appropriate for the system in which the invention is being employed.

Upon the occurrence of a Triggering Event 2, a Event Counter 3 is incremented to keep track of the number of events/updates the system has performed on the rule system. Event Counter 3 is used to determine when the rule updates are saved to non-volatile memory C. However, while non-volatile storage C is typically slower, faster non-volatile storage C would allow updates to be saved directly to memory and thereby obviate the need for the Event Counter 3.

After incrementing the Event Counter 3, the Dynamically Weighted First Character Rule List is updated 4 and then the Dynamically Weighted Rule Tree is updated 5. After these updates 4 & 5 are finished, a determination 6 is made whether enough Triggering Events 2 have occurred to warrant a commit 7 of the updates 4 & 5 to non-volatile memory storage C. It is noted that the number of Triggering Events 2 required before performing a commit 7 can be tailored to the application. For instance, if CPU time is at a premium then Event Counter 3 can be preset to commit 7 only after a large number of Triggering Events 2 have occurred. In contrast, if the system does not have a large average "up time", then a smaller number of Triggering Events should cause the rules 4 & 5 to be committed 7. If both of the above cases are true, then the first few commits 7 may occur after only a few Triggering Events 2 and as the system stays powered-up the commits 7 can occur at progressively larger numbers of Triggering Events 2 to help conserve the CPU cycles.

If enough Triggering Events 2 have indeed occurred, then the rules 4 & 5 are committed 7 to non-volatile storage C, whereupon the Event Counter is reset 8, and the process flow then reenters the Wait State 1. If enough Triggering Events have not occurred, then the process flow proceeds directly to the Wait State 1 without committing 7 the rules 4 & 5 to non-volatile memory storage C.

Figure 3:
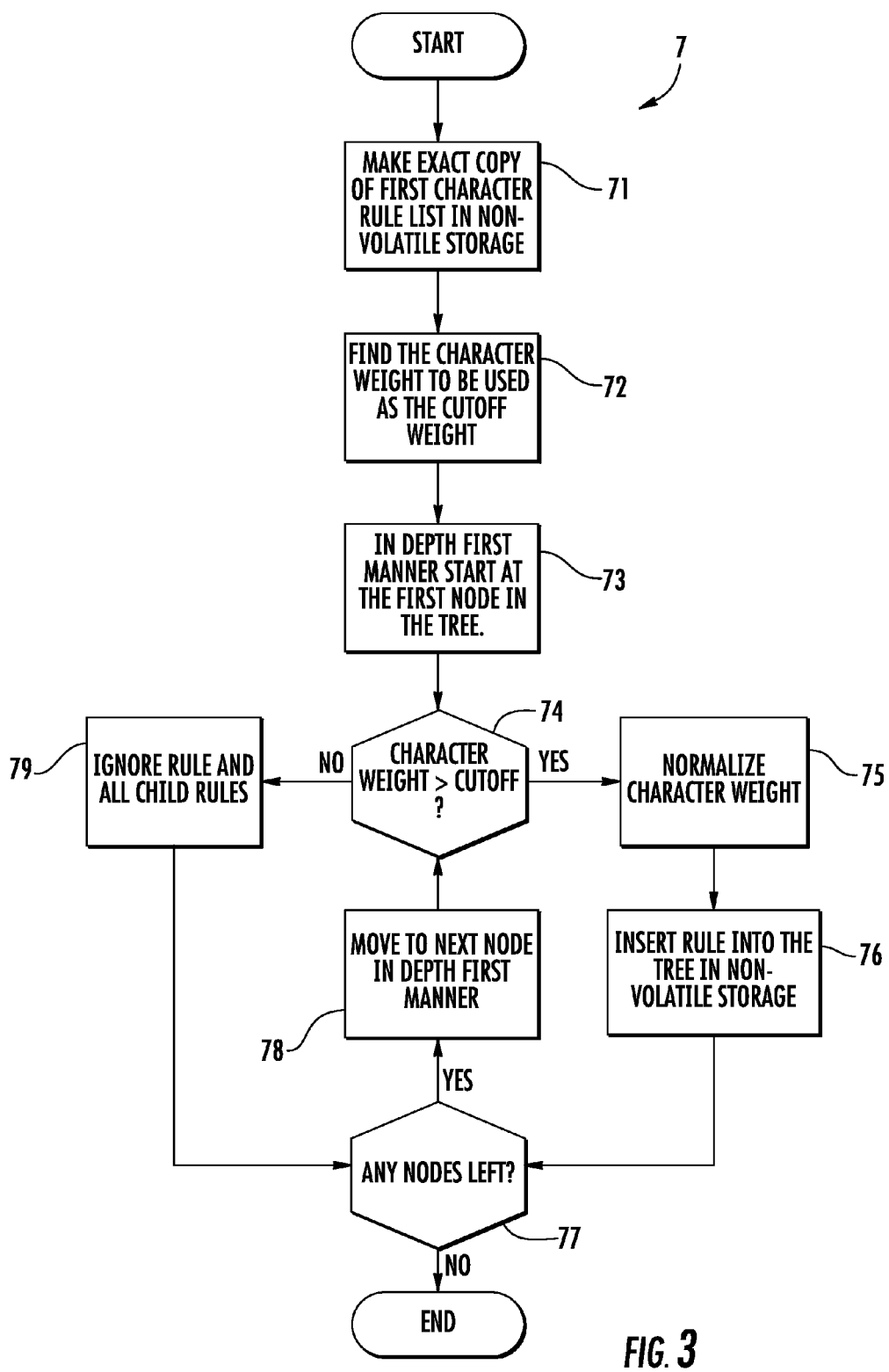
FIG. 3 is a flow chart that describes in greater detail the functionality of committing the rules to memory storage.

FIG. 3 is a flow chart that describes in greater detail the functionality of committing 7 the rules 4 & 5 of FIG. 2 to non-volatile memory storage C. The first step is to make an exact copy 71 of the First Character Rule List 4. Notably, there is no need to compact its size because it is only 26 bytes in size (based on the 26 letters of the English alphabet). It is noted however, since each character requires one byte of storage space, larger alphabets would require proportionally more storage space and therefore compacting may become desirable.

The first step in storing the Rule Tree 5 is to determine at what cutoff 72 the Rules 4 & 5 should not be stored. Cutoff 72 is preferably recalculated every time the rule tree is stored, thus allowing the counter 72 to adapt to any state the Rule Tree 5 may be in. For example, if non-volatile storage C is limited, pruning of the Rule Tree prior to storage is preferred. More particularly, the cutoff 72 is compared to the current value of the Rule. If the value is less than the cutoff 72, the Rule is not stored, nor are any of its children stored as they will always have smaller values than their parent.

Once the cutoff 72 is determined, starting at the first or root node 73 in the Rule Tree 5, a comparison 74 is made of the root node's value with the cutoff to determine if it is greater than the cutoff 72. If it is greater, then the rule's value is normalized 75 so that it will fit into the non-volatile storage C.

Normalization 75 is preferably only done when the maximum rule value found in the tree would not fully fit into the non-volatile storage C without its most significant bits being truncated. The maximum value to which a rule's value may be normalized 75 is configurable depending on how much space can be used. For example, in an implementation of the preferred embodiment, all values were normalized to a maximum of 512 or 9 bits. This maximum will limit the granularity with which the rules can be compared (similar to the difference between a 8 bit and 10 bit Analog to Digital Converter). If a smaller maximum was used such as 256 or 128, then more rules could have the same count due to the normalization process 75. Through testing of the preferred embodiment, it appears preferable to have a maximum value that is one to two times the total number of rules from the tree to be stored in non-volatile storage C.

Another aspect of the maximum value is the system's adaptability. If the maximum is larger, then it means that a brand new rule will have to occur a greater number of times before it could potentially overcome a previously dominant rule. This becomes less of an issue if the system is allowed to run for long lengths of time without power cycles. However, if frequent power cycles are expected, and if the maximum value is increased too much, then there may not be enough time for a potentially "good" rule to work its way "up" and not get pruned. Conversely, if the maximum value is decreased too much, then new rules will be able to overcome the previously dominant rules too fast, potentially causing an oscillation in the performance of the system.

Once the rule has been normalized 75, it is inserted 76 into the tree that is in non-volatile storage C. This requires a simple tree traversing and a copy of the data to the new location. Once the rule has been copied 76, a check is made 77 to determine if there are any rules left that need to be stored. If so, and if there are more rules, then the next rule in a depth-first manner is selected 78. With this rule, it is checked to determine if its value is larger than the cutoff 74. If it is less than the cutoff, it is ignored 79 as well as all of its children. The loop continues until all rules that need to be stored have been stored.

Figure 4:
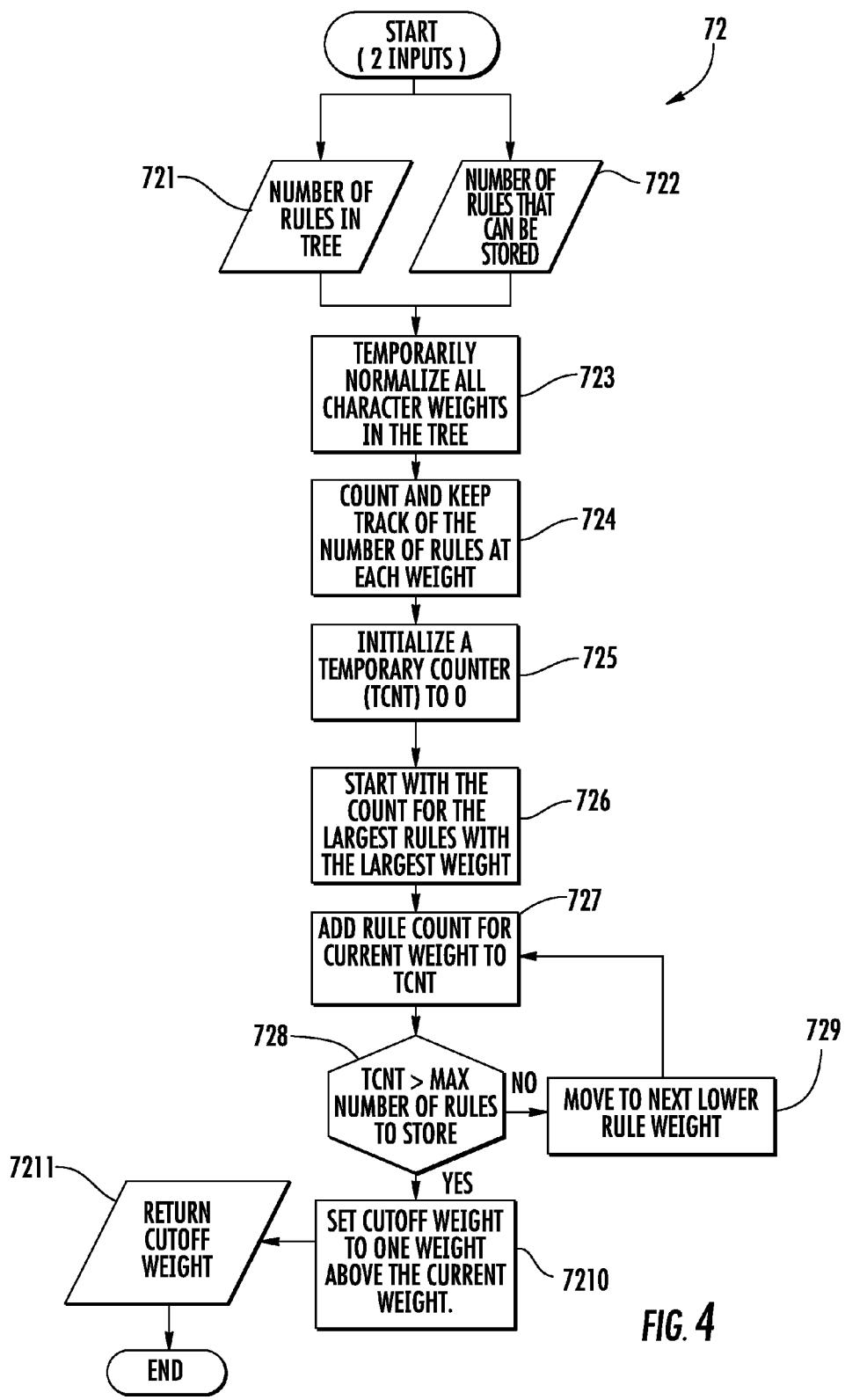
FIG. 4 is a flow chart of the functionality of determining the cutoff weight calculation.

FIG. 4 is a flow chart of the functionality of the determining the cutoff 72 in FIG. 3. The cut-off weight calculation 72 requires two additional inputs besides the rule tree itself. First, the actual number of rules that are currently in the tree must be determined 721 as well as the maximum number of rules that can be stored in non-volatile storage 722. The next step is to traverse the rule tree and temporarily normalize each of the rule's weights 723. The normalization calculation 723 preferably is the same that is used when committing the rules to non-volatile storage C. However, now that the rules have been normalized, the entire tree should be traversed to determine how many rules exist at each weight level 724 to thereby generate a histogram of the rule weights. A simple counter is used for the balance of the calculation to know when enough rules exist to then initialize a temporary counter to zero 725.

Starting with the largest weight 726 (512 in the implementation of the preferred embodiment), the number of occurrences of rules with this weight is added 727 to the temporary counter, TCNT, that had just been initialized to zero 725. If the value in TCNT is not greater than the maximum number of rules that can be stored 728, then the process flows to the next lower weight in the system 729 and again its count is added 727 to the temporary counter. If the value in TCNT is still not greater than the maximum number of rules that can be stored 728, the process again flows to the next lower weight in the system 729. Once the maximum that can be stored is exceeded 728, the cut-off weight is set to be one weight above the current one 7210. While this assures that more rules cannot be written to non-volatile storage than there is room for, this also means that there may well be unused storage space, because perhaps some of the rules at the next lower weight would have fit. If these other rules were included, then it may conceptually be possible to improve performance across power cycles as there would be a slightly larger database of rules at start-up. However, based upon experimentation with the preferred embodiment, there was very little improvement, if any, even when assuring that all of the available storage space was used. Apparently, no appreciable performance improvement is due to the final rules being stored are not nearly as common and therefore do not add as much to the predictive capabilities of the system. Once the cutoff weight is determined 7210, it is returned 7211 so that it can be used.

Figure 5:
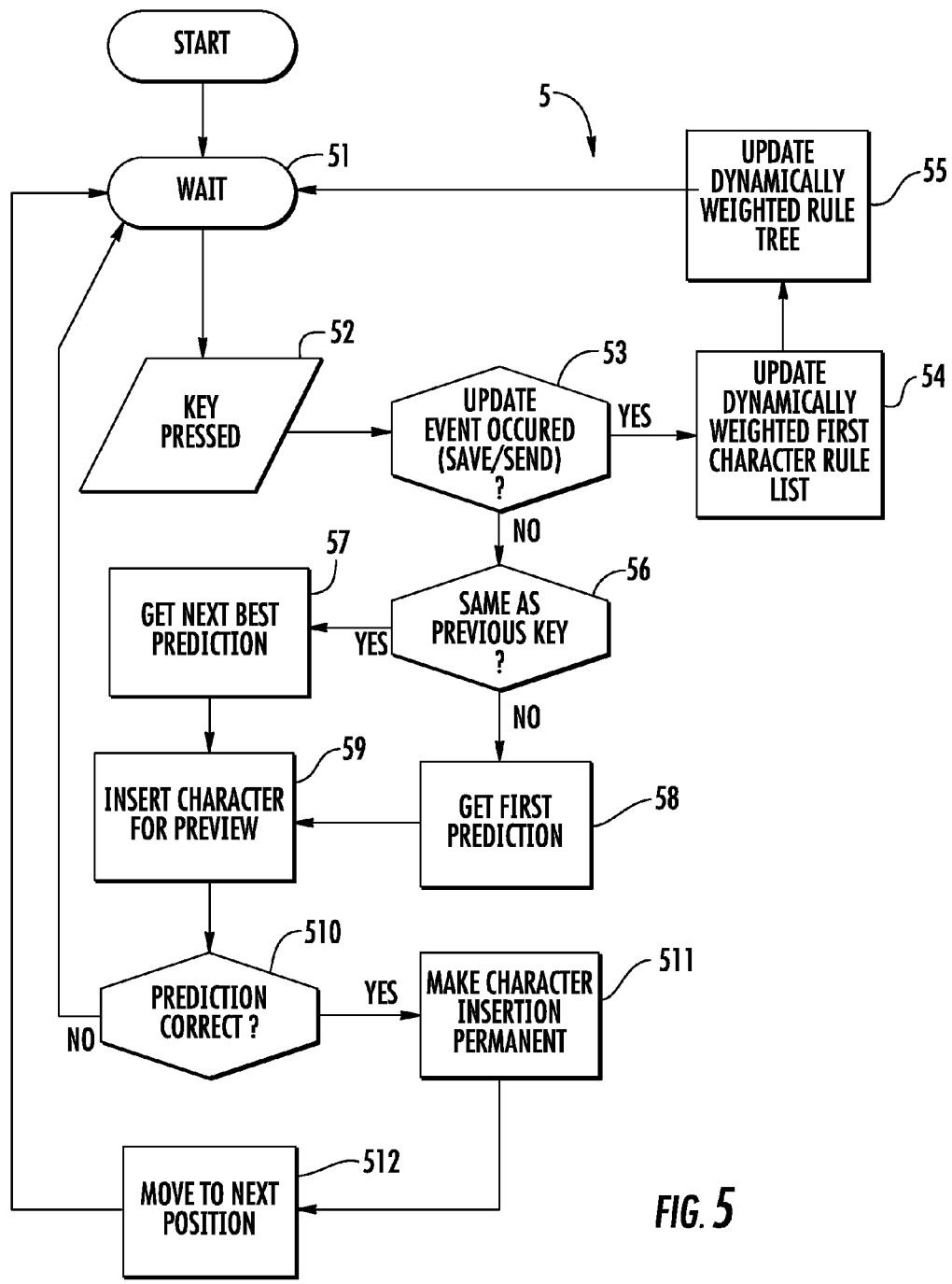
FIG. 5 is a flow chart that illustrates at a high level the operation of the method of the invention as key presses are passed through the system.

FIG. 5 is a flow chart that illustrates at a high level the operation of the method of the invention as key presses are passed through the system. The system starts-up in a wait state and preferably waits until a keypress from the user before anything else happens 51. When a keypress is received 52, a check is made to determine if an update event has occurred 53. In the preferred embodiment, an update event is a keypress indicating that a message is intended to be saved, or sent. However, in other embodiments, the update event could be any other type of event depending on the system's requirements. In the preferred embodiment, if the event did occur, the First Character Rule List is updated 54 and as well as the Rule Tree 55 after which a return to the wait state occurs 55. In other embodiments, after an update it would still be possible to continue to process the keypress in another manner as well. If the event did not occur, a check is made to determine if this is a repeated keypress (in other words the user pressed the same key two or more times in a row) 56. If it is a repeated keypress, then the next best prediction is ascertained 57. There are two main reasons this would occur. The first is that the originally predicted character was not correct as can happen some percentage of the time. The other reason is that the user simply mistakenly pressed the button a second time. If the keypress was not a repeated key, then the first prediction for the next character is ascertained 58.

Coming from either step 57 or 58, the prediction is temporarily inserted into the display buffer to allow the user to see what was predicted 59. The user then determines if the prediction is correct or not. If the user likes the current prediction, then the user makes the prediction permanent 510, which will cause the cursor to shift to the next position 511. Notably, the cursor may have the usual capability of auto advancing either due to a different keypress or from a timeout (In either case the implementation does not pertain to the functionality of the prediction system). After the cursor has been advanced, the process flow returns to the wait state until the user presses another key at which point the system starts anew.

Figure 6:
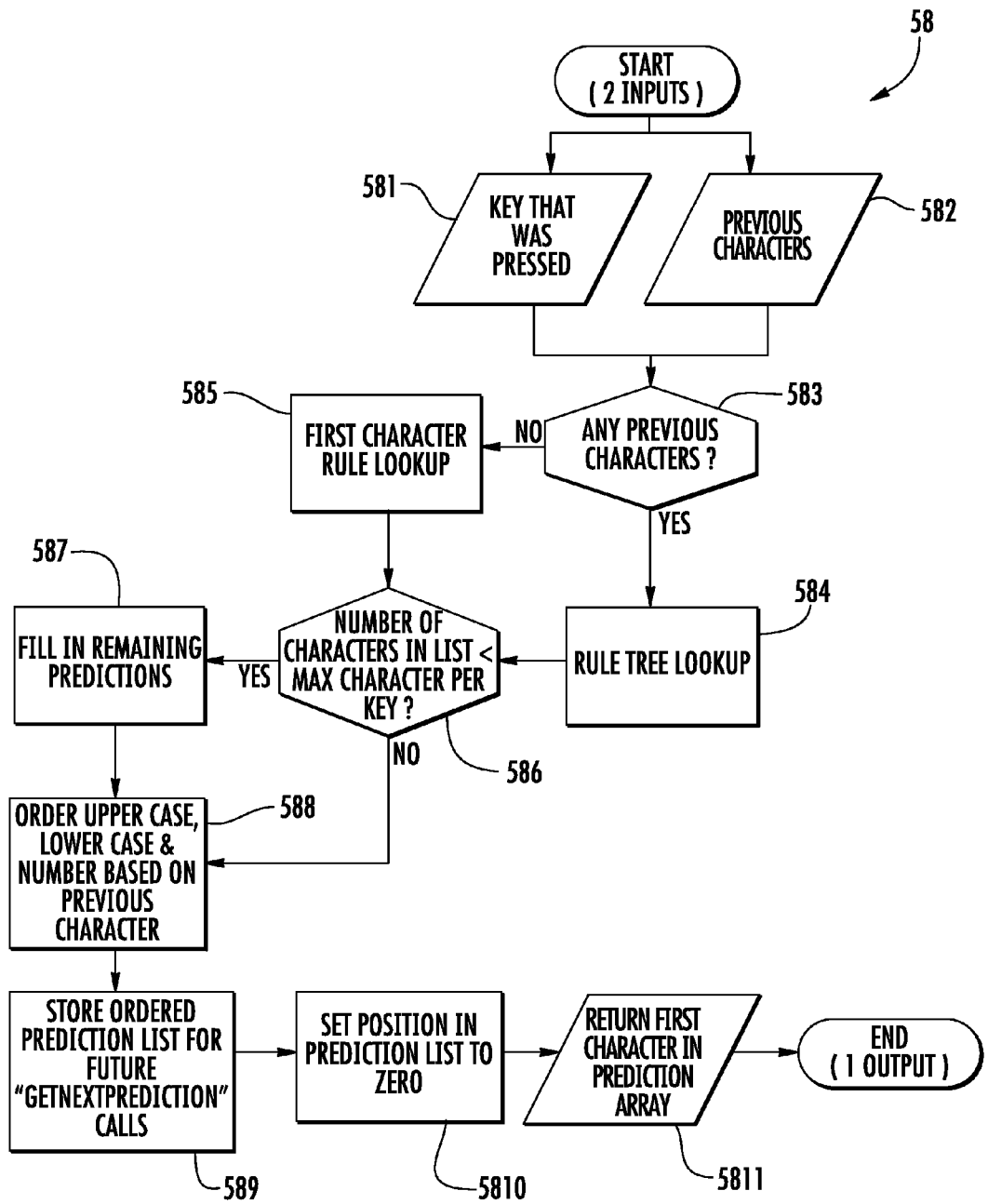
FIG. 6 is a flow chart that describes in greater detail the functionality of the first character predication.

FIG. 6 is a flow chart that describes in greater detail the functionality of the first character predication 58 of FIG. 5. When making the first prediction 58, the system passes the key that was pressed 581, and the previous characters if any that have been entered into the system 582. First, a check is made to determine if any previous characters were passed 583. If no previous characters were given, then the process knows it is at the start of a new word, and the predictions in the First Character Rule List are looked up 585. However, if there is at least one previous character, then the Rule Tree is used to lookup the predictions 584. Both lookups 584 and 585 will return a variable size list containing from zero to "maximum characters mapped per key." If no characters are returned, then it means that no rules currently exist that pertain to the previous characters and the key that was pressed, or in the case of the first character in a word there is no rule that exists pertaining to just the key that was pressed. The reason for returning more than one character is that the system must order all the characters that are mapped to a key in the best possible order for the situation.

Say for example a key was mapped with 'A', 'B', and 'C' then there are six possible orderings for those three characters. There will be some cases where A,B,C will be the most likely order, while in other cases C,A,B will be the best order. The Rule Tree will determine everything it is capable of based on the rules that exist. In some cases it may only be able to make a prediction about the first character, due to lack of the needed rules, while in other cases it will be capable of ordering all three characters if it has the rules that it needs.

Once prediction has been made by the Rule Tree, a check is made to determine if all the characters mapped to the key 586 were included in the prediction. If all the characters could not be predicted, then the rest are filled-in in alphabetical order 67. It is noted that in the preferred embodiment, more intelligent orderings were attempted, but no significant gains (<0.5%) in performance were obtained, so it is believed to be more valuable to eliminate the added complexity that such more intelligent orderings would require.

The system includes the additional heuristic to help guess if the user wanted upper case, lower case, or numbers to be entered at the keypress. The system will therefore order the predictions so that it reduces the number of keypresses needed to reach the desired letter case or number 588. The heuristic simply keeps track of the case of the last character entered, or if the last character was a number, whereupon the system will maintain this case until the user switches case at which point it will remember the new case.

For example, if the previous character was an upper case letter then the ordering of the predictions could be as follows: Upper characters, then the number, then the lower case characters. If the previous character was a lower case letter then the ordering could be: lower case, then the number, than the upper case. If the previous character was a number then the ordering could be: the number, then uppercase, then lowercase.

Once the prediction is complete (in preferred embodiment it is seven characters, upper case, number, and lower case), it is stored so that subsequent calls to a GetNextPrediction step will be very efficient without processing delays 589. The position of the current prediction in the stored prediction list is preferably initialized to zero to indicate that the first prediction is going to be returned 5810. Finally, the single character prediction is returned 5811.

Figure 7:
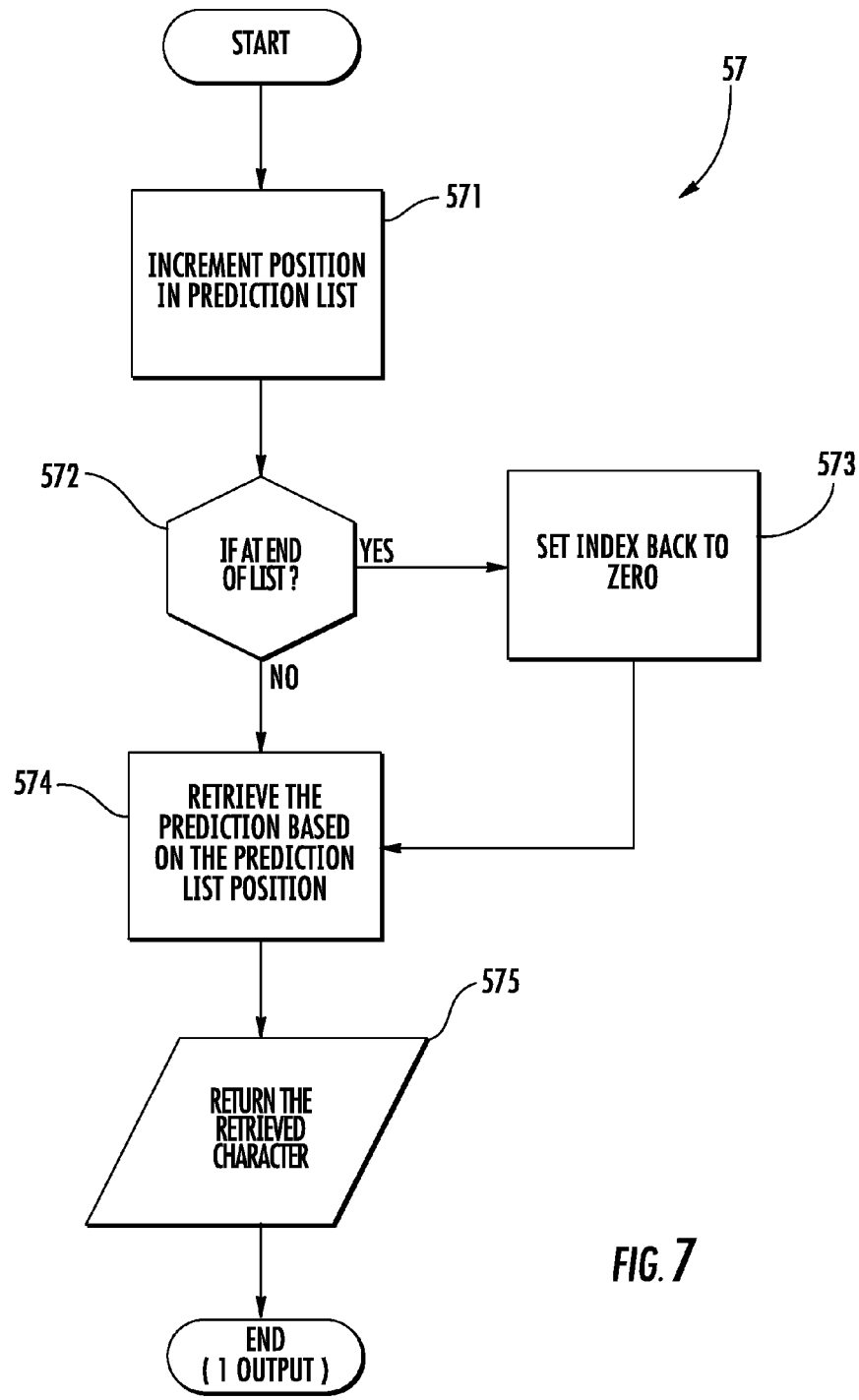
FIG. 7 is a flow chart that describes in greater detail the functionality of looking up the next best prediction.

FIG. 7 is a flow chart that describes in greater detail the functionality of looking up the next best prediction 57 of FIG. 6. The first step is to increment the counter indicating the position in the prediction list 571. The prediction list contains the upper and lower case letters and the number that the keypress could represent. Because the predictions will "wrap around", a check is made to determine if the end of the list has been reached 572. If yes, then the position counter is set back to zero, so that the flow can loop back through the list 573. The next step is to retrieve the prediction based on the current counter value 574, and finally return that value 575.

Figure 8:
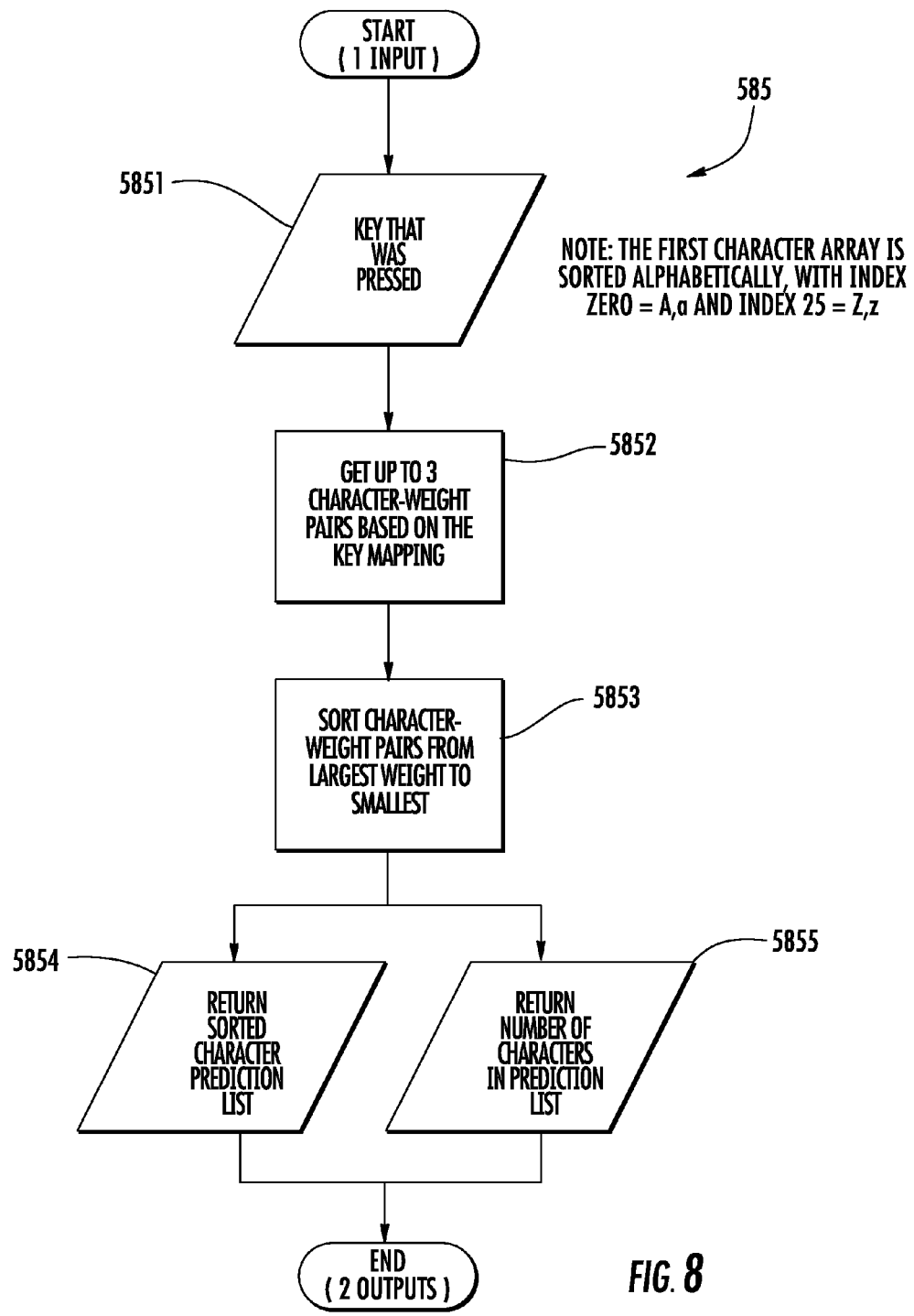
FIG. 8 is a flow chart that describes in greater detail the functionality of looking up the predictions in the First Character Rule List.

FIG. 8 is a flow chart that describes in greater detail the functionality of looking up the predictions in the First Character Rule List 585 of FIG. 6. Looking up the first character starts with a single input which is the key that was pressed 5851. A search through the first character rules is conducted until all rules related to the keypress are found 5852. In the preferred embodiment, a maximum of three rules can be found one for each letter mapped to a given key. Next, the rules that were found based on their weights are sorted 5853. Finally, the sorted predictions and the number of rules that were found are returned 5854 and 5855.

Figure 9:
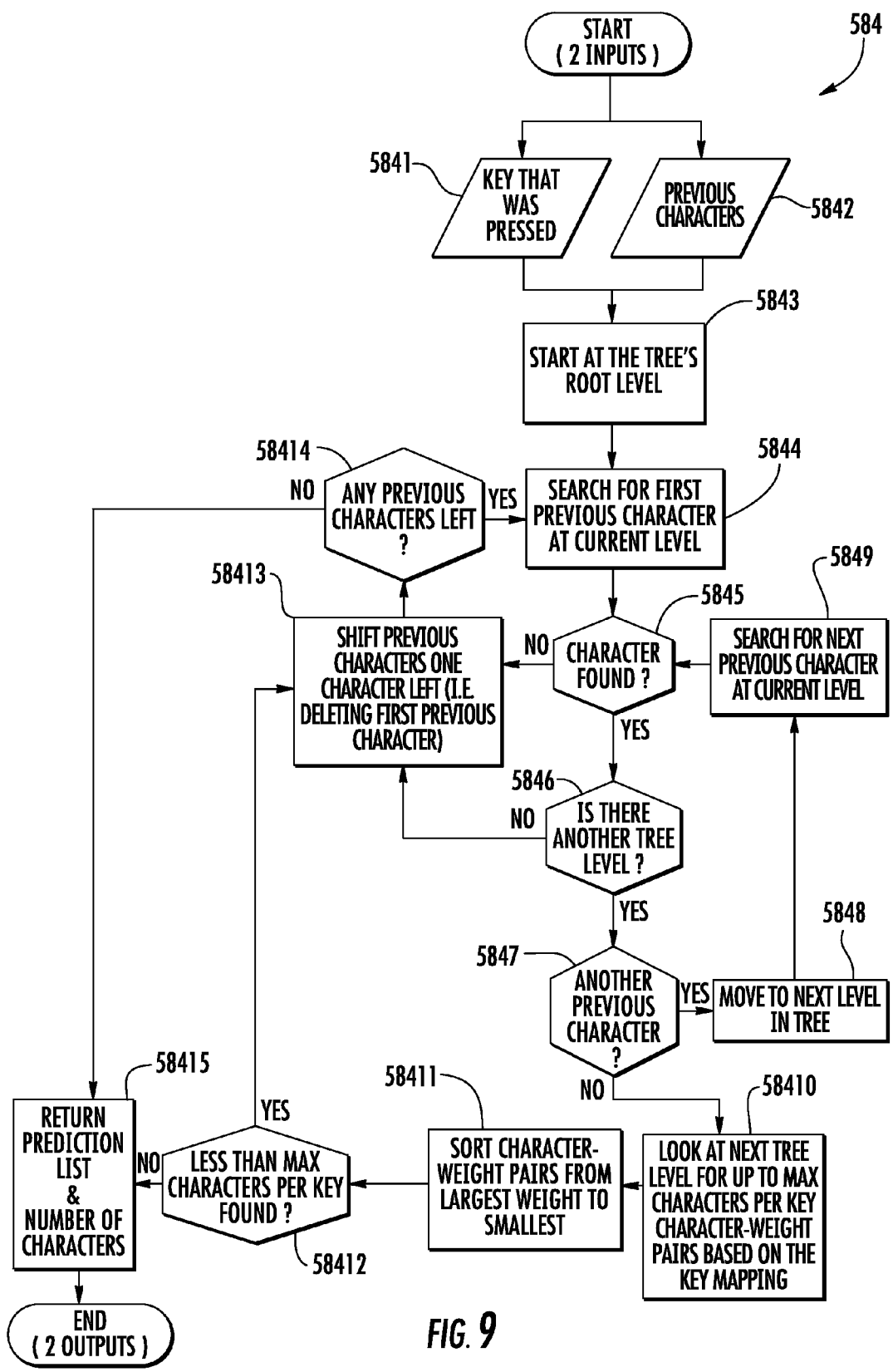
FIG. 9 is a flow chart that describes in greater detail the functionality of looking up a prediction or rule in the Rule Tree.

FIG. 9 is a flow chart that describes in greater detail the functionality of looking up the Rules to make the predictions 584 of FIG. 6. The rule tree lookup 64 starts with two inputs which are the key that was pressed and the previous characters of the word that have already been entered 5841 and 5842. The lookup starts at the root node of the rule tree 5843. Note that each node of the rule tree can actually be a list of rules each of which has the ability to have a child node, so the branching factor of the tree can be quite large (i.e., as large as the number of characters in the prediction alphabet).

Moving through the list on the current (first) node the first of the previous characters which were given are found 5854. For example, if the string "thei" was being passed, the character that would be looked for is 't'. The next step is to check if the character has actually been found 5845. If the character is not found, then the previous character string is shifted to the left one place giving us a new first letter 58413. For example, the initial string of "thei" would look like "hei" after the shift.

Before continuing a check is made to determine if there are still previous characters to process. In this example, there are still three characters left 58414. With the new previous character string, the first character (e.g., 'h') is again looked for in the current node 5844 and 5845. If this time a rule is found (e.g., for 'h'), a check is made to determine if it has a child node. In other words—is there another level in the tree leading from this rule 5846? If there is not, then a rule at the next level cannot be found (e.g., a rule cannot be found for the 'e' and one at the $3^{rd}$ level for the 'i'). This means that the system has yet to see this combination of letters as no rules have been added to the tree yet. Also, if there is not another level, it means a shorter previous character string must therefore be used. In the current example, this would mean the previous character string would now look like "ei". If however there is another level in the tree leading away from the first (e.g., the 'h' rule) at the first level. Next, it is determined whether there are any further previous characters to process 5847. In the current example, there is, so the current level pointer is moved to the next level in the tree (i.e. the 'h' rule's child node) 5848.

At the next level in the tree, a search is made for the next previous character (e.g., 'e') at the current level. The process of checking if it exists is repeated. If it cannot be found, then it means this depth first search path is a dead end again causing us to shorten our previous character string by one and searching again. If on the other hand, it (e.g., "e") is found at the current level, a check is made to determine if there is yet another level in the tree leading away from the (e.g., 'e') rule. If so, once again a search for the next character (e.g., 'i') in the previous character string occurs. The same process applies to this character as all the previous.

Assuming that a rule is found for the character (e.g., 'i'), the process returns to step 5845. Remembering that in our current example the letter 'i' was the last letter in our original previous character string "thei", the next step is to again to determine if there is yet another level to the tree leading away from the 'i', 5856. If not, the previous character string is again shortened. If however there is another level, a check is again made to determine if there is another character in the previous character string. In current example, there are not any more so the next level is examined to ascertain what characters are predicted based on the given keypress input 58410.

For example, assuming that the user was attempting to enter the word "their" and that the letters 'p, q, and r' were mapped to the key 6. Based on that keypress and the keymapping of the alphabet, the letter 'p, q, and r' rules will be looked for at the next level in the tree. Further assume that the following (rule, value) pairs: (r, 10), (p,3) and (q,6) were found. In such case, the 'r' rule would be the "strongest" rule found so it would be the first letter predicted. The strongest rule can be defined as the rule that was found using the greatest number of previous characters and that has the largest value of all the rules found at the same node as it. If there exists more than one rule, they are preferably sorted with the largest value coming first 58411.

If some of the rules exist, there should be a check to determine if all of them have been looked up 58412. Depending on the keymapping of a system, this could mean that each key could have a maximum of 2, 3, 4 or more characters per key. To make the most informed prediction possible it is preferable that all the rules should be found. Because only one of the maximum, in this case three, rules have been found so far, the process flow loops back 58413 to again reduce the number of previous characters looked for, assuming there are any left. If there are previous characters left then all the rules found with fewer previous characters as input will always be secondary predictions to the one found the first time through.

In other words, regardless of the value they have, they will be sorted such that they can never take over the front-most position of the prediction list. Once previous characters are depleted, or once the maximum number of predictions for this keypress have been found, the predictions and the number of predictions found are returned 58415.

Figure 10:
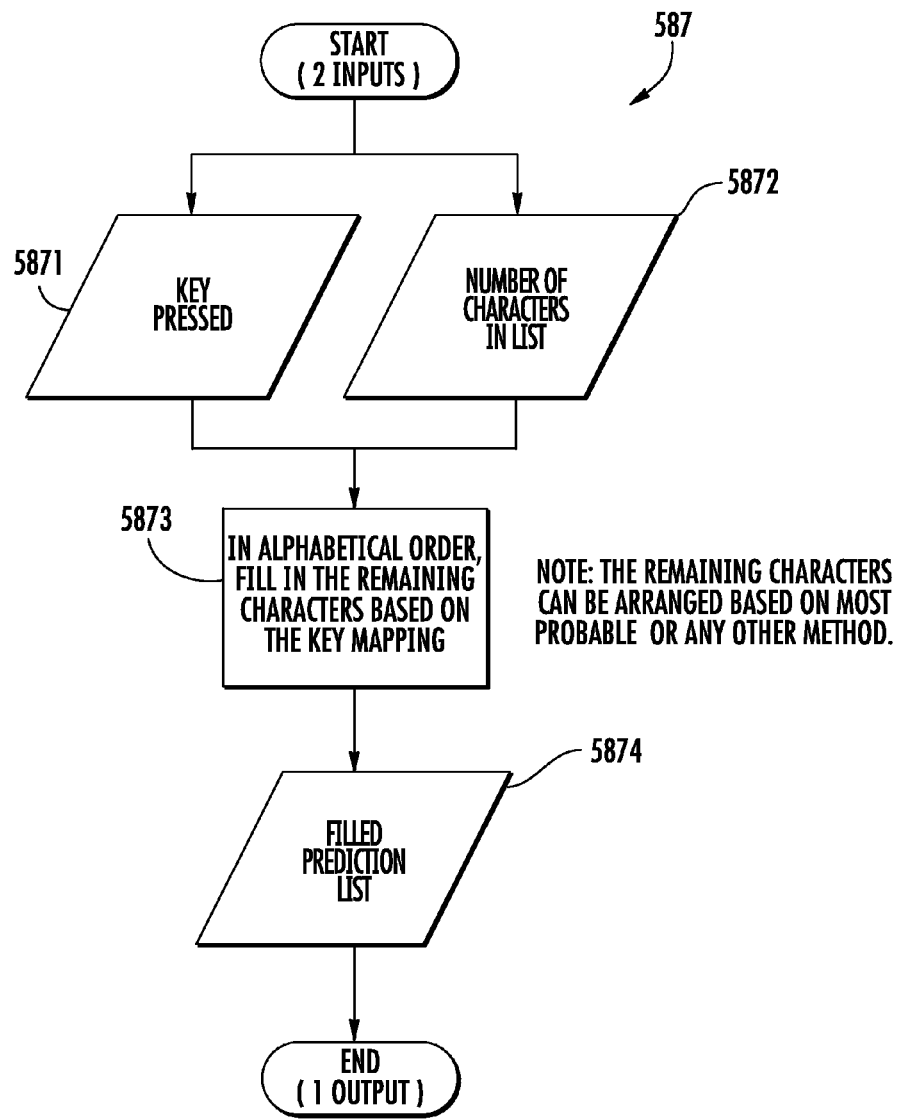
FIG. 10 is a flow chart that describes in greater detail the functionality of filling-in any remaining characters in alphabetical order if one or more of all the characters cannot be predicted.

FIG. 10 is a flow chart that describes in greater detail the functionality of filling-in the characters in alphabetical order if all the characters could not be predicted 5877. More particularly, in the cases where the prediction tree is not able to provide a complete prediction, then the empty slots of the prediction are filled-in with the remaining letters that are mapped to the key that was pressed. To do this, two inputs are provided 5871 and 5872, which are the key that was pressed, and the number of characters that were predicted. For instance, if there is a maximum of three characters mapped to each key and only one of those characters could be predicted, then the remaining two characters would need to be filled-in.

Through testing of the aforementioned preferred embodiment, it was determined that the majority of performance increases came through more accurate predictions of the first character in the prediction list. It was also determined that when "intelligent" methods of filling in the remaining predictions were used, the performance of the system only increased by a very small percentage. The increase was small enough that increased predication performance would not be noticeable to the user, nor did it seem to overcome the overhead required to perform the "intelligent" filling operation. With that in mind, all the remaining characters are preferably deemed "predicted" as being in alphabetical order and are filled-in accordingly 5873. Once the prediction list is full, the process flow returns it so that it can be used 5874.

Figure 11:
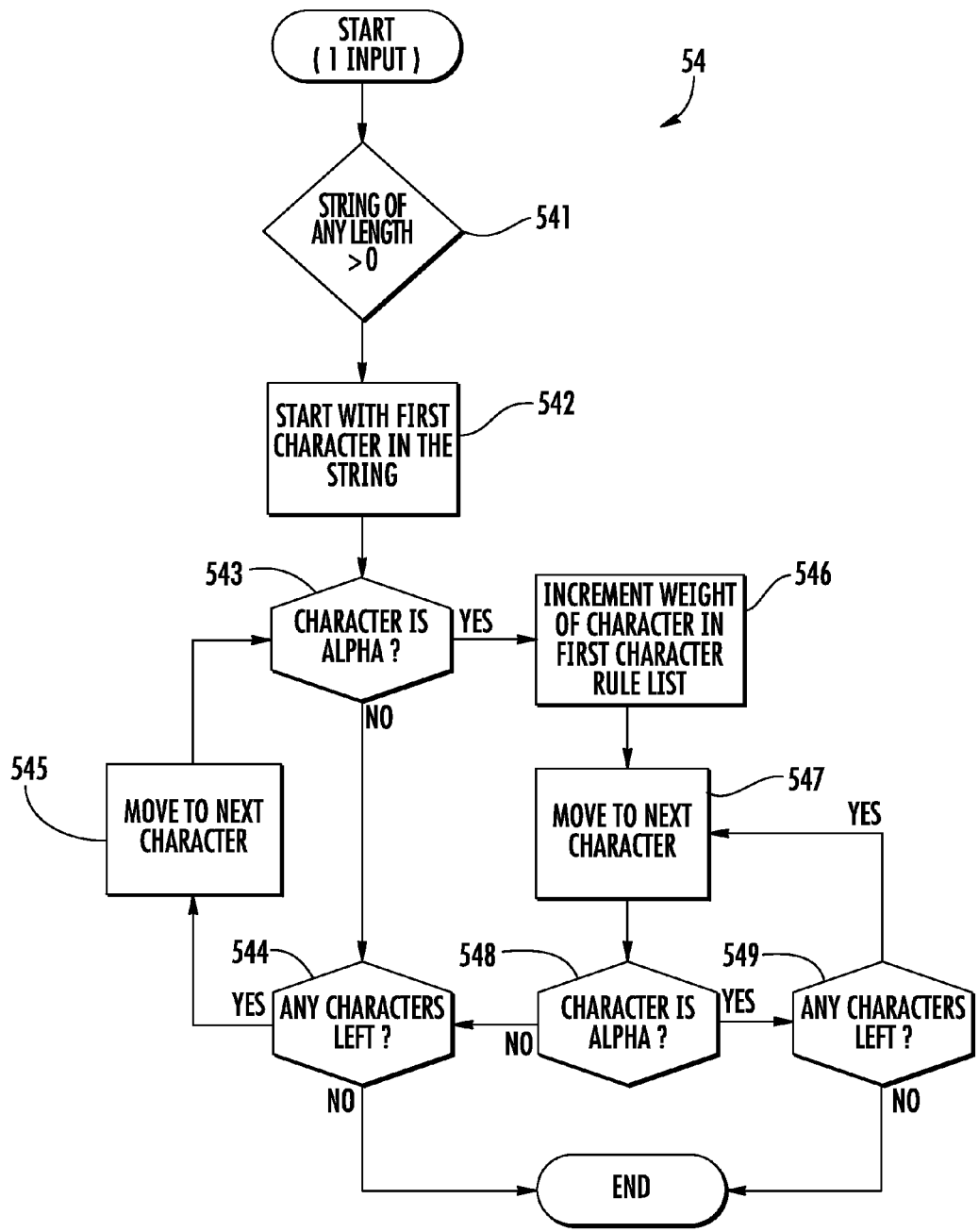
FIG. 11 is a flow chart that illustrates in greater detail the functionality of the First Character Rule List being updated if a Triggering Event does not occur.

FIG. 11 is a flow chart that illustrates in greater detail the functionality of the First Character Rule List being updated 54. More specifically, updating of the First Character Rule List is a process that only requires the input of a string that contains at least one character 541. The system is capable of dealing with any unformatted string. In other words, characters not used in prediction can be present in the string without any issues. In the preferred embodiment, if the system encounters a character not used in predictions it interprets it as white space and a word break.

Starting with the first character in the string 542, a check is made to determine if it is a valid prediction alphabet character 543. If it is, that characters weight/value in the First Character Rule List is incremented 546. The next step is to find the beginning of the next word in order to find that word's first letter. This is done one character at a time because neither when the current word will end nor where the next will begin are known. So first, the process flow moves to the next character 547, and check is made to determine if it is a valid prediction alphabet character 548. If so, it is checked to determine if there are any characters left in the string 549. If there are none, the process is finished, but if there is at least one present the process continues to move to each subsequent character checking if they are valid prediction alphabet characters. If one is found that is not, a check for more characters is made at step 544. If there are still characters remaining, the next character in line is ascertained 545. If this new character is not a valid prediction character, the cycle continues through the characters until the next valid one is found. This is the method used to move through any whitespace that may be present between the words. Once finding the next valid character its value is updated again in the rule list and the process is started again to finding the first letter of the next word. This continues until no characters remain in the original input string.

Figure 12:
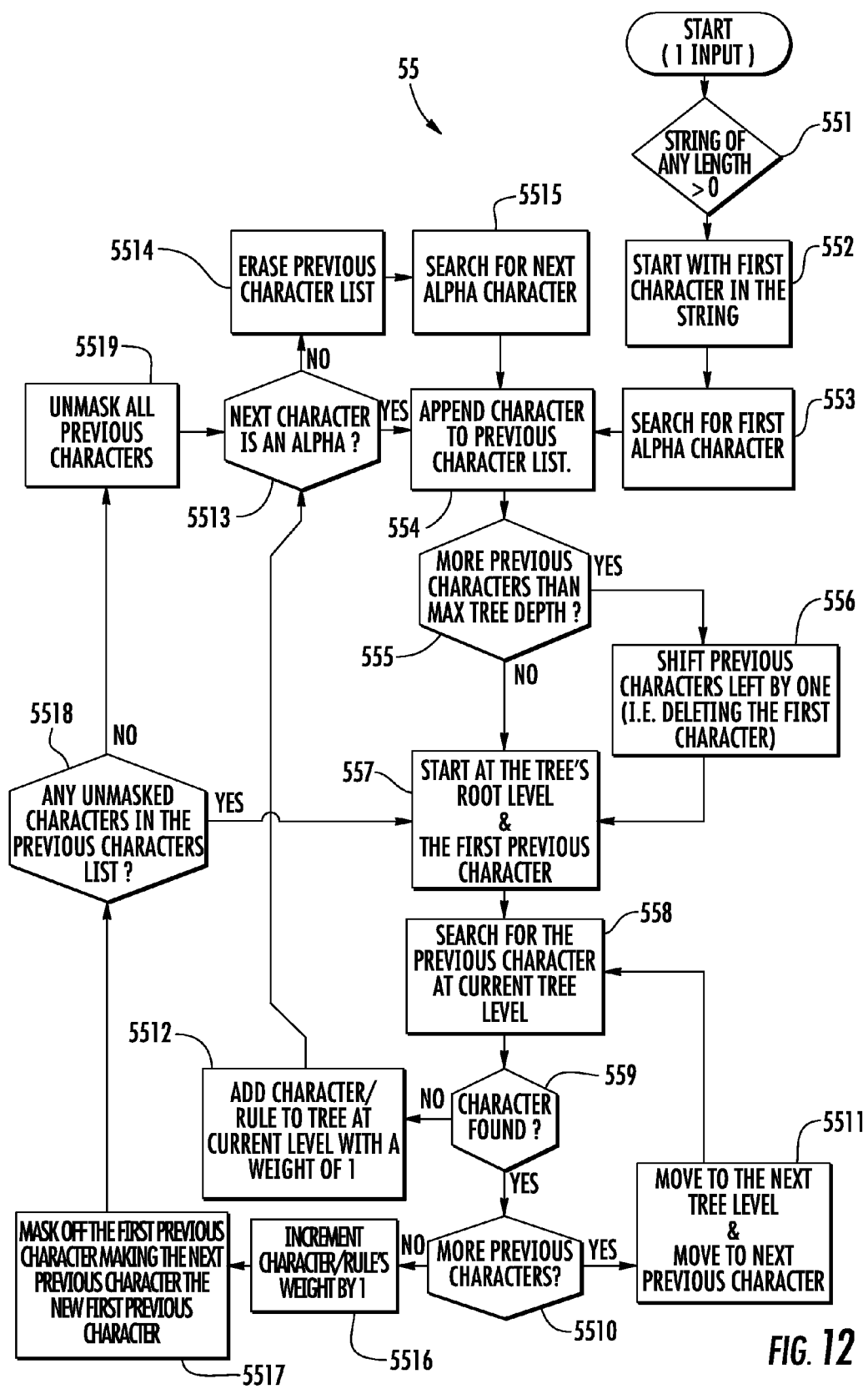
FIG. 12 is a flow chart of the step of updating the Rule Tree if a Triggering Event does not occur.

FIG. 12 is a flow chart that illustrates in greater detail the functionality of the Rule Tree being updated. Updating of the rule tree is a process that only requires the input of a string that contains at least one character 551. The system is capable of dealing with any unformatted string. In other words, characters not used in prediction can be present in the string without any issues. In the preferred embodiment, if the system encounters a character not used in predictions it interprets it as white space and a word break.

Starting with the first character in the string 552, a linear search is made for the first valid prediction alphabet character 553. As soon as a valid character is found, it is appended to a previous character list 554. For example, if the string passed in was "Hello, this is a test." Then the previous character list would now look like "H". The prediction system has the ability to limit the maximum number of previous characters that should be used to make a prediction. In the implementation of the preferred embodiment, it was found that three previous characters worked best considering the rest of the system's parameters, however for sake of brevity only two previous characters will be used in this example.

A check is made 555 to determine if the previous character list has a length greater than that maximum. In the case of our example, the limit has not been reached yet so the process will start at the root node 557 of the rule tree and then search through to see if the first previous character 'H' can be found 558. It is noted that the prediction system is preferably case-insensitive so everything is processed as if it were lower case. Next, a check is made to determine if a corresponding rule is found in the current node 559, where each node can be a linked list of character value pairs or Rules. Assuming for example that the letter 'H' was not found, a new rule would be created to keep track of the fact that 'H' was the first character in a new word. This is done by adding a new rule to the end of this node's list of rules. After adding the rule, its value, counter or weight is set to be equal to one 5512. This indicates that the rule has occurred only a single time. This value is also used later on to compare against other rules when performing a prediction.

Once the rule has been added, a check is made to determine if the next character is in the prediction alphabet 5513. If it is not, the previous character list is erased 5514, as this means the current word is finished. After erasing the previous character list, a linear search is again conducted through the input string until another character from the prediction alphabet is found 5515. From this point, the same cycle as with the letter 'H' from our example is continued. Assuming a return to the example where a search is being conducted for the next valid character, the next character that is found is an 'e'. This is valid so it is appended to the previous character list 554, thereby producing "He". A check is made to make sure too many previous characters are not being examined 555, and then the process starts again at the root tree level to find the 'H' rule that was just added to the tree 557 and 558. Once it is found 559, a check is made to determine if there are anymore previous characters to use 5510. In this example, there is an 'e', so the process moves to the next tree level 5511.

The next tree node is reached by following the child pointer of the 'H' rule. Here a search is conducted on the now current node for 'e' 558. After determining that the rule does not exist 559, a new rule is added for 'e' to the current node's rule list and set it to a value of one. After the rule is added, the process of obtaining the next character continues, leading through steps 5513 and 5514.

At this point, the previous character list will look like "Hel". If at step 555 the maximum depth is assumed to be two, the process continues to step 556 where the first character of the previous word list is eliminated, thereby providing a resultant list of "el". The same process is repeated to find the rules 'e' at the root node and the 'l' rule at the 'e' rule's child node. It is assumed that both of these rules already exist. This process thus continues to step 5510 where a check is made to determine if there are anymore previous characters to find. In the current example, 'l' was the last previous character, so the process moves onto step 5516 where the 'l' rule's value is incremented by one.

The next step is to mask off (i.e., do not delete, just ignore) the first character in the previous character list 5517. For the sake of visualization, assume the '*' represents a masked previous character, which results in a new previous character list of "*l" which the system will process as if it was just the list "l". The next step is to check if there are any unmasked characters left in the previous character list 5518. In the current example, the character 'l' is still unmasked, so the process flow moves to step 557 and again a search is conducted for what is now the first previous character at the root node 557 and 558. Assuming that a rule exists for 'l' in the root node, it is incremented 559, 5510, and 5516). The next step is to mask off the first character. Remembering that the cycle previous to the current one had the string "el" which was masked to give us "*l", this time the 'l' is the first character and therefore results in the string "" 5517. A check is made to determine if there are any unmasked characters 5518**.

Since the previous character list has been completely masked, the process flow moves to step 5519 to unmask all the characters and thereby change the string from "" back to "el". Start back into the loop, the next character is looked for to find another 'l' resulting in "ell", which is reduced to "ll" because of the tree depth limitation. The appropriate updates are made and then the next new character 'o' results in "llo" which is reduced to "lo" because of the tree depth limitation. Finally, after those are updated, the next character is checked 5513, and a <space> character is found. Since this is not a valid prediction alphabet character, the process flow moves to step 5514 to delete the complete contents of the previous character list. This occurs because the end of the current word has been found and the system readies itself to deal with the next new word. In step 5515**, searching for the next valid prediction alphabet character continues until one is found. This allows the system to deal with any number of invalid or whitespace characters that may be separating each word.

This entire process continues until all letters in the original input string have been processed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A method for predicting characters input into a reduced-key keypad comprising a plurality of multi-character keys, the method comprising:
using a processor cooperating with the reduced-key keypad to populate a multi-level rule tree comprising a plurality of rules, each rule predicting a character in a current input word, rules in a respective level predicting a numbered character position in the current input word;
said multi-level rule tree comprising a plurality of branches connecting the plurality of rules together;
each branch associated with a respective two-character sequence in the current input word, an upper level rule for predicting a first character in the respective two-character sequence, and a lower level rule for predicting a second character in the respective two-character sequence, each rule having a counter value representing a number of correct predictions;
for each previously correct prediction of the current input word using a respective rule, using the processor to increment the corresponding counter value in the multi-level rule tree to weight the respective rule;
using the processor to delete from the multi-level rule tree at least one rule having a weight value less than a threshold value; and
using the processor to weight subsequent predictions of other input characters based upon the counter values in the multi-level rule tree.

2. The method of claim 1 further comprising for each previously incorrect prediction of the current input word using the respective rule, maintaining the corresponding counter value to weight the respective rule.

3. The method of claim 1 further comprising updating the multi-level rule tree after each input character is selected.

4. The method of claim 1 further comprising updating the multi-level rule tree after all the input characters of an inputted word are selected.

5. The method of claim 1 further comprising updating the multi-level rule tree after all the input characters of a plurality of inputted words are selected.

6. The method of claim 1 wherein the predicting of the current input word comprises predicting the current input word based upon a plurality of preceding inputted characters.

7. The method of claim 1 further comprising normalizing the weighting of subsequent predictions of other input characters based upon the number of times the previous predictions correctly predicted the current input word.

8. The method of claim 1 wherein the predicting of the current input word is independent of a language of the current input word.

9. The method of claim 1 further comprising when the current input word is a first character of an inputted word, displaying the key characters associated with the selected multi-character key one at a time allowing selection of the inputted character.

10. The method of claim 9 wherein the displaying all the key characters associated with the key one at a time occurs in a predicted sequence.

11. The method of claim 9 further comprising:
accessing a first character rule list corresponding to the first character of the inputted word; and
processing a multi-level rule tree including a multi-level hierarchical tree of rules for sequentially predicting and displaying of succeeding word characters of the inputted word.

12. An electronic device comprising:
a reduced-key keypad comprising a plurality of multi-character keys; and
a processor cooperating with said reduced-key keypad for predicting characters input therein and being configured to
populate a multi-level rule tree comprising a plurality of rules, each rule configured to predict a character in a current input word, rules in a respective level configured to predict a numbered character position in the current input word, the multi-level rule tree comprising a plurality of branches connecting the plurality of rules together, each branch being associated with a respective two-character sequence in the current input word, an upper level rule configured to predict a first character in the respective two-character sequence, and a lower level rule configured to predict a second character in the respective two-character sequence, each rule having a counter value representing a number of correct predictions, for each previously correct prediction of the current input word using a respective rule, increment the corresponding counter value in the multi-level rule tree to weight the respective rule, delete from the multi-level rule tree at least one rule having a weight value less than a threshold value, and weight subsequent predictions of other input characters based upon the counter values in the multi-level rule tree.

13. The electronic device of claim 12 wherein said processor is configured to for each previously incorrect prediction of the current input word using the respective rule, maintain the corresponding counter value to weight the respective rule.

14. The electronic device of claim 12 wherein said processor is configured to update the multi-level rule tree after each input character is selected.

15. The electronic device of claim 12 wherein said processor is configured to update the multi-level rule tree after all the input characters of an inputted word are selected.

16. The electronic device of claim 12 wherein said processor is configured to update the multi-level rule tree after all the input characters of a plurality of inputted words are selected.

17. The electronic device of claim 12 wherein said processor is configured to predict the current input word by at least predicting the current input word based upon a plurality of preceding inputted characters.

18. The electronic device of claim 12 wherein said processor is configured to normalize the weighting of subsequent predictions of other input characters based upon the number of times the previous predictions correctly predicted the current input word.

19. The electronic device of claim 12 wherein said processor is configured to predict the current input word independently of a language of the current input word.

20. The electronic device of claim 12 wherein said processor is configured to, when the current input word is a first character of an inputted word, display the key characters associated with the selected multi-character key one at a time allowing selection of the inputted character.

21. The electronic device of claim 20 wherein said processor is configured to display all the key characters associated with the key one at a time occurs in a predicted sequence.

22. The electronic device of claim 20 wherein said processor is configured to:
- access a first character rule list corresponding to the first character of the inputted word; and
- process a multi-level rule tree including a multi-level hierarchical tree of rules for sequentially predicting and displaying of succeeding word characters of the inputted word.

* * * * *